（12） United States Patent
Jung et al.

(10) Patent No.: US 7,787,067 B2
(45) Date of Patent: Aug. 31, 2010

(54) DISPLAY SUBSTRATE AND METHOD OF MANUFACTURING THE SAME

(75) Inventors: Doo-Hee Jung, Seoul (KR); Kyung-Su Mun, Cheonan-si (KR); Jeong-Min Park, Seoul (KR); Joo-Han Kim, Yongin-si (KR); Joo-Ae Youn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 12/027,607

(22) Filed: Feb. 7, 2008

(65) Prior Publication Data

US 2008/0192164 A1  Aug. 14, 2008

(30) Foreign Application Priority Data

Feb. 9, 2007   (KR)  ...................... 10-2007-0013470

(51) Int. Cl.
*G02F 1/136* (2006.01)

(52) U.S. Cl. ........................................ 349/46; 349/187
(58) Field of Classification Search ....................... None
See application file for complete search history.

(56) References Cited

U.S. PATENT DOCUMENTS

2004/0125327 A1* 7/2004 Choi et al. .................. 349/187
2008/0002125 A1* 1/2008 Kim ........................... 349/140

* cited by examiner

*Primary Examiner*—Tina M Wong
(74) *Attorney, Agent, or Firm*—H.C. Park & Associates, PLC

(57) ABSTRACT

A display substrate includes a first metal pattern, a first insulating layer, a first electrode, and a second metal pattern. The first metal pattern includes a gate line and a signal line. The first insulating layer is disposed on a substrate having the first metal pattern formed thereon. A first opening passes through the first insulating layer to partially expose the signal line. The first electrode is disposed on the first insulating layer corresponding to a unit pixel. The second metal pattern includes a connection electrode contacting the first electrode and the signal line through the first opening and a data line.

16 Claims, 17 Drawing Sheets

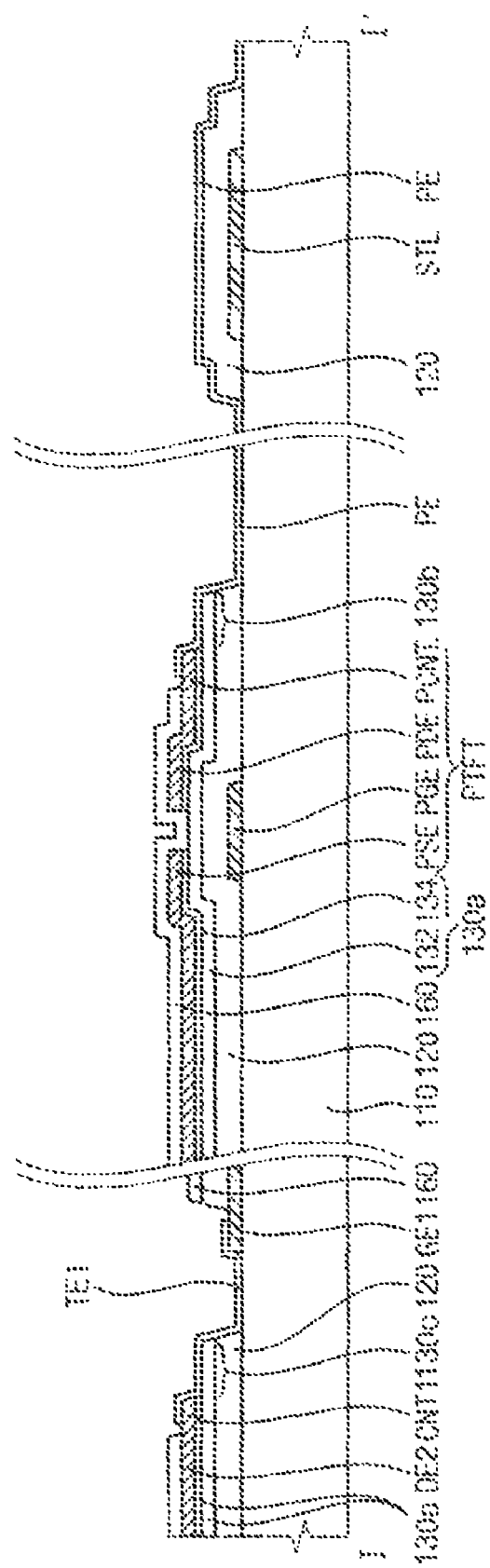

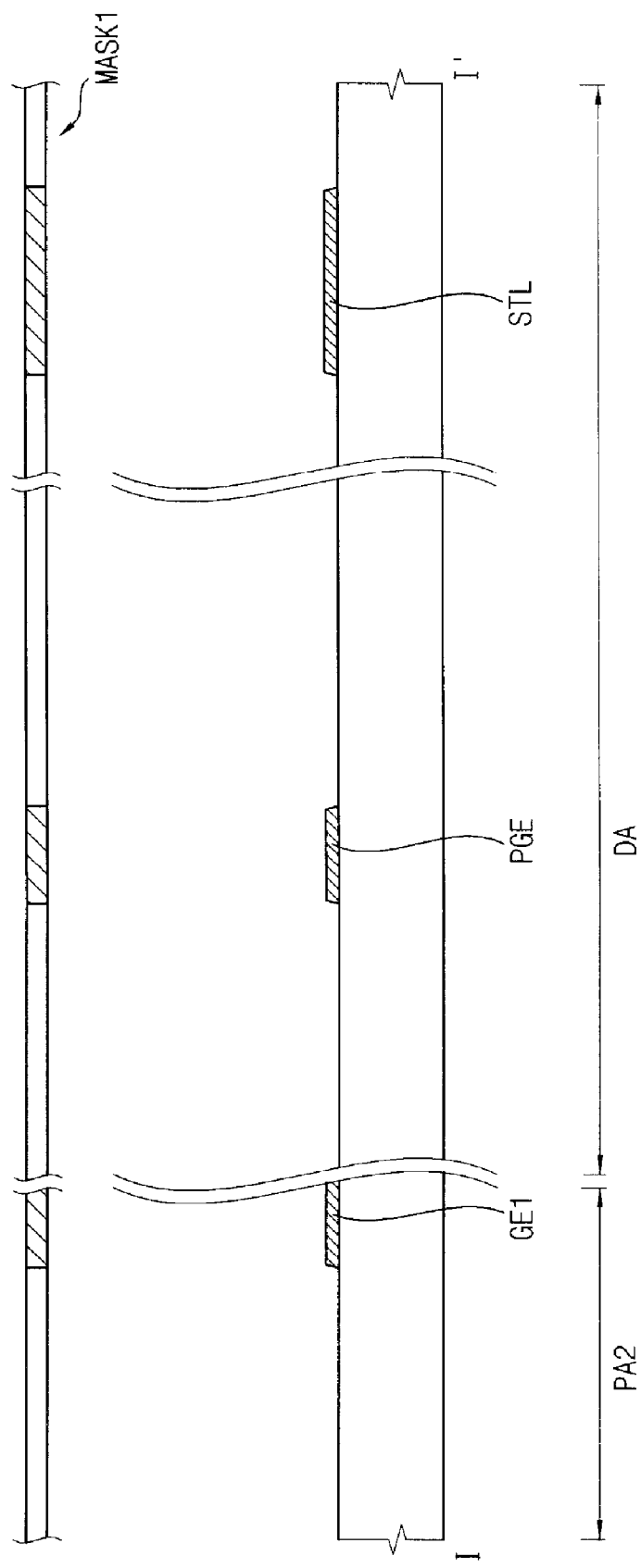

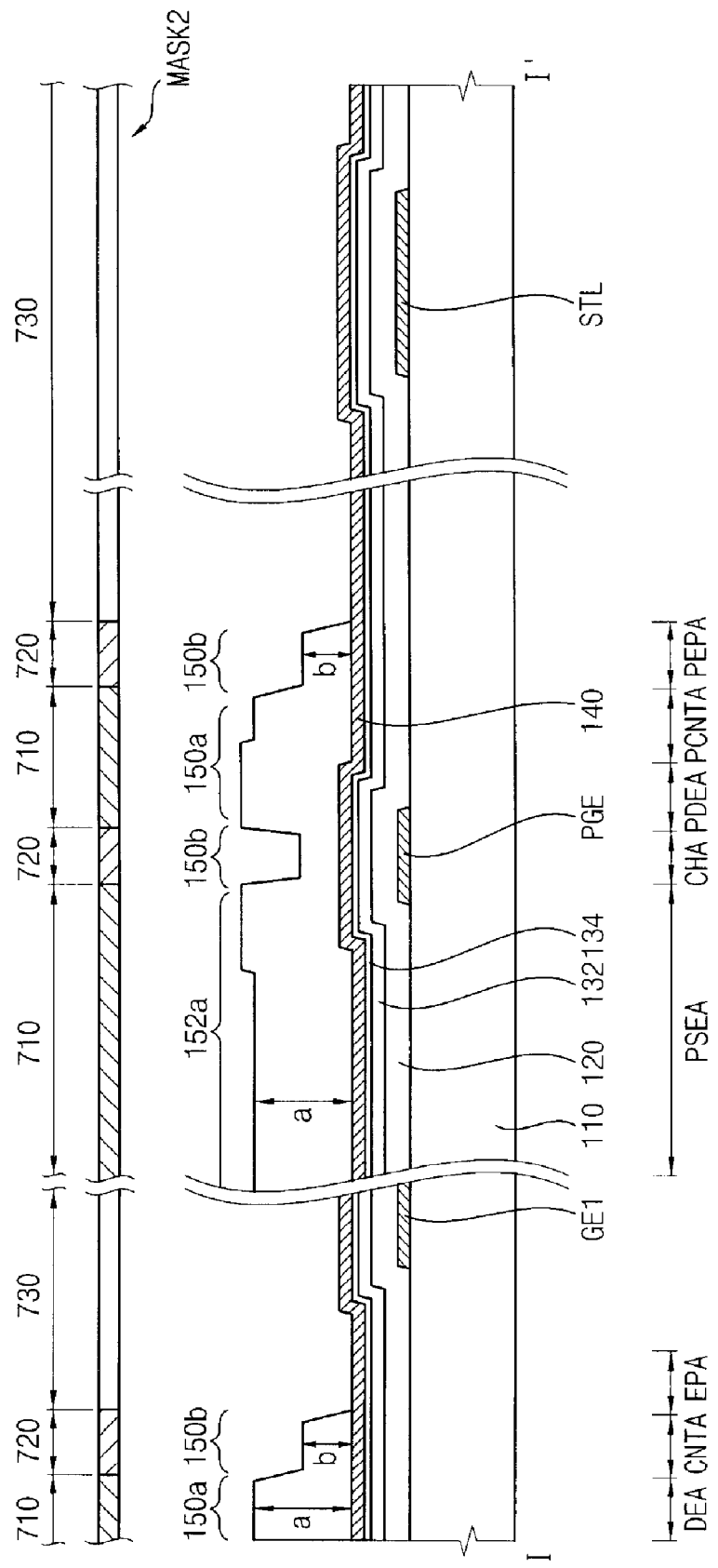

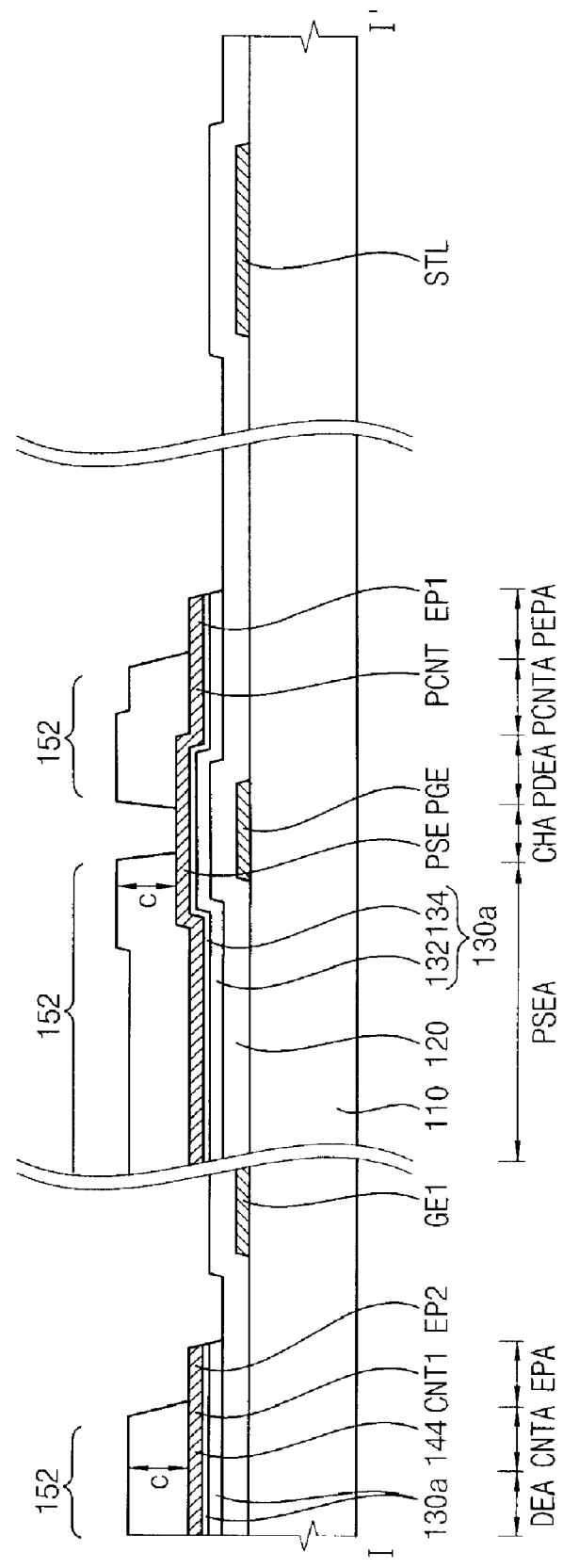

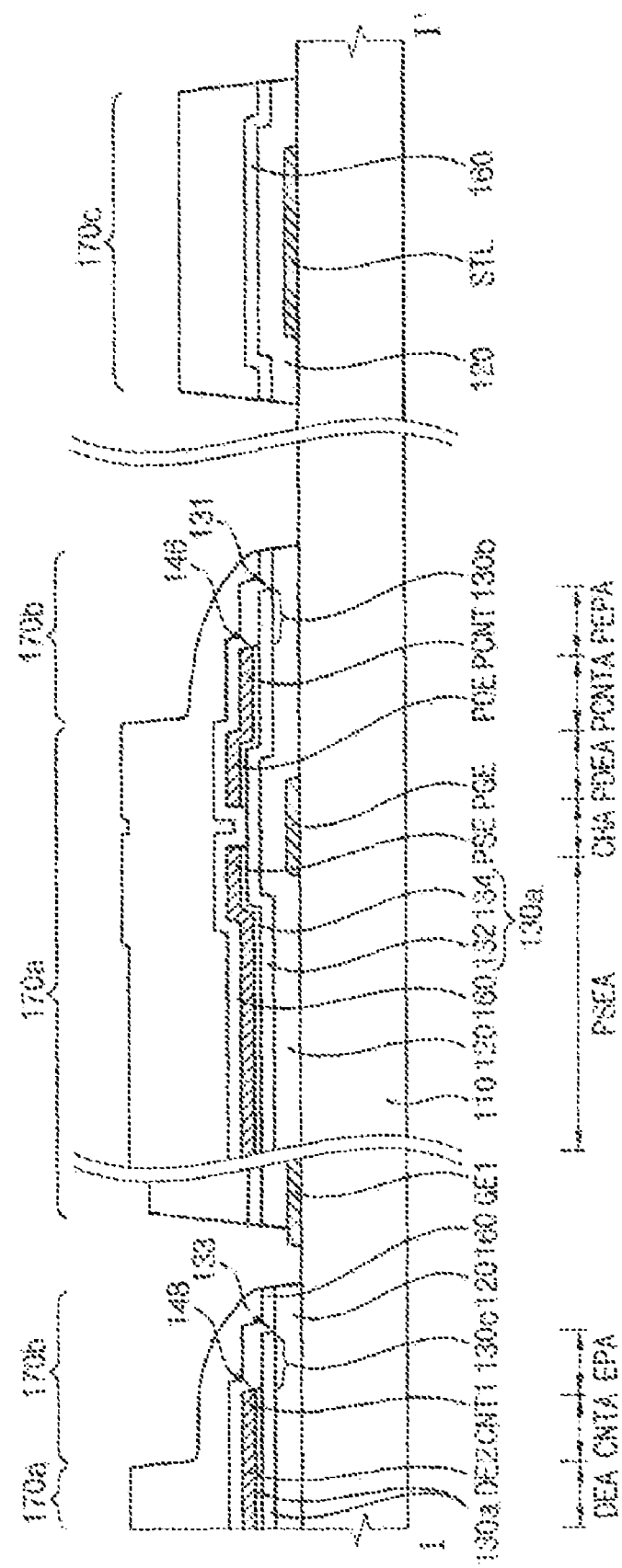

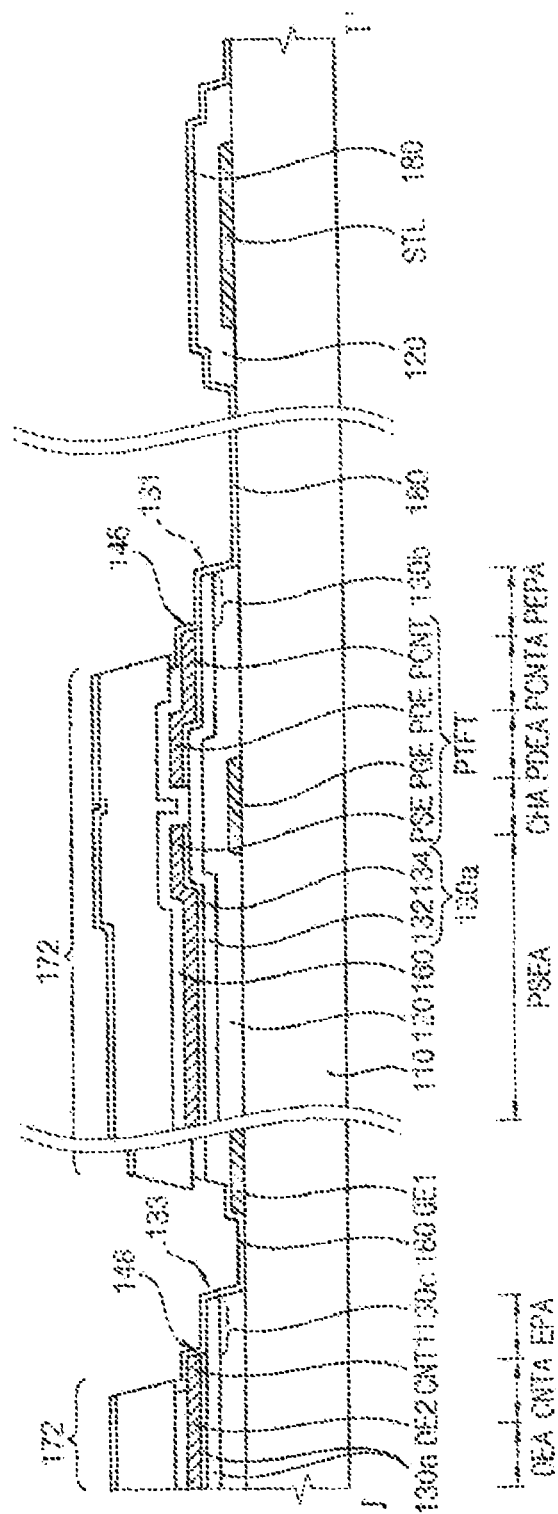

DISPLAY SUBSTRATE AND METHOD OF MANUFACTURING THE SAME

CROSS-REFERENCE TO RELATED APPLICATION

This application claims priority from and the benefit of Korean Patent Application No. 10-2007-0013470, filed on Feb. 9, 2007, which is hereby incorporated by reference for all purposes as if fully set forth herein.

BACKGROUND OF THE INVENTION

1. Field of the Invention

The present invention relates to a display substrate. More particularly, the present invention relates to a display substrate and a method of manufacturing the display substrate.

2. Discussion of the Background

A display substrate includes gate lines, source lines, and switching elements. The gate lines, the source lines, and the switching elements are formed through a photo process using an exposure mask. When fewer exposure masks are used in processes for manufacturing the display substrate, time and costs for manufacturing the display substrate may be reduced and productivity may be enhanced. Recently, a process for manufacturing a display substrate using three masks has been developed.

The process using three masks uses a first mask to form a gate pattern, a second mask to form a semiconductor pattern and a source pattern, and a third mask to pattern a passivation layer to expose a contact part. A pixel electrode is formed through a lift-off method.

In the three-mask process, a side face of an end portion of the contact part is formed to have a relatively large angle with respect to a base substrate as compared to a process in which two different masks are respectively used to form the semiconductor pattern and the source pattern. As a result, a profile defect of the photoresist pattern may be generated. The profile defect of the photoresist pattern may generate an electrical short between the pixel electrode and the contact part. Accordingly, the reliability of the display substrate and the process using three masks may be decreased.

SUMMARY OF THE INVENTION

The present invention provides a display substrate that may be capable of ensuring the overlay margin of a mask to enhance reliability of the display substrate.

The present invention further provides a method of manufacturing the display substrate.

Additional features of the invention will be set forth in the description which follows, and in part will be apparent from the description, or may be learned by practice of the invention.

The present invention discloses a display substrate including a contact electrode, a semiconductor pattern, and a transparent electrode. The contact electrode is disposed on an end portion of a switching element disposed on a base substrate. The semiconductor pattern includes a protrusion disposed under the contact electrode and protruding beyond the contact electrode. The transparent electrode contacts the contact electrode and the protrusion.

The present invention also discloses a method of manufacturing a display substrate including sequentially forming a channel layer and a source metal layer on a base substrate. Then, a first photoresist pattern is formed. The first photoresist pattern includes a first thickness part formed on a contact area of the source metal layer and a second thickness part formed on an end area of the source metal layer. The end area is adjacent to the contact area. The second thickness part is thinner than the first thickness part. The source metal layer and the channel layer are patterned using the first photoresist pattern to form a contact electrode and a protrusion. The contact electrode is formed on the contact area. The protrusion protrudes beyond the contact electrode and extends from the contact area to the end area. A passivation layer is formed on the base substrate having the contact electrode and the protrusion formed thereon. Then a transparent electrode layer is formed. The transparent electrode layer contacts a portion of the contact electrode exposed by removing a portion of the passivation layer corresponding to the contact electrode and the protrusion.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 is a cross-sectional view taken along line I-I' shown in FIG. 3.

FIG. 6, FIG. 7A, FIG. 7B, FIG. 7C, FIG. 7D, FIG. 7E, FIG. 7F, FIG. 8A, FIG. 8B, FIG. 8C, FIG. 8D, and FIG. 8E are cross-sectional views showing a process for manufacturing a display substrate shown in FIG. 4.

DETAILED DESCRIPTION OF THE ILLUSTRATED EMBODIMENTS

Figure 1:
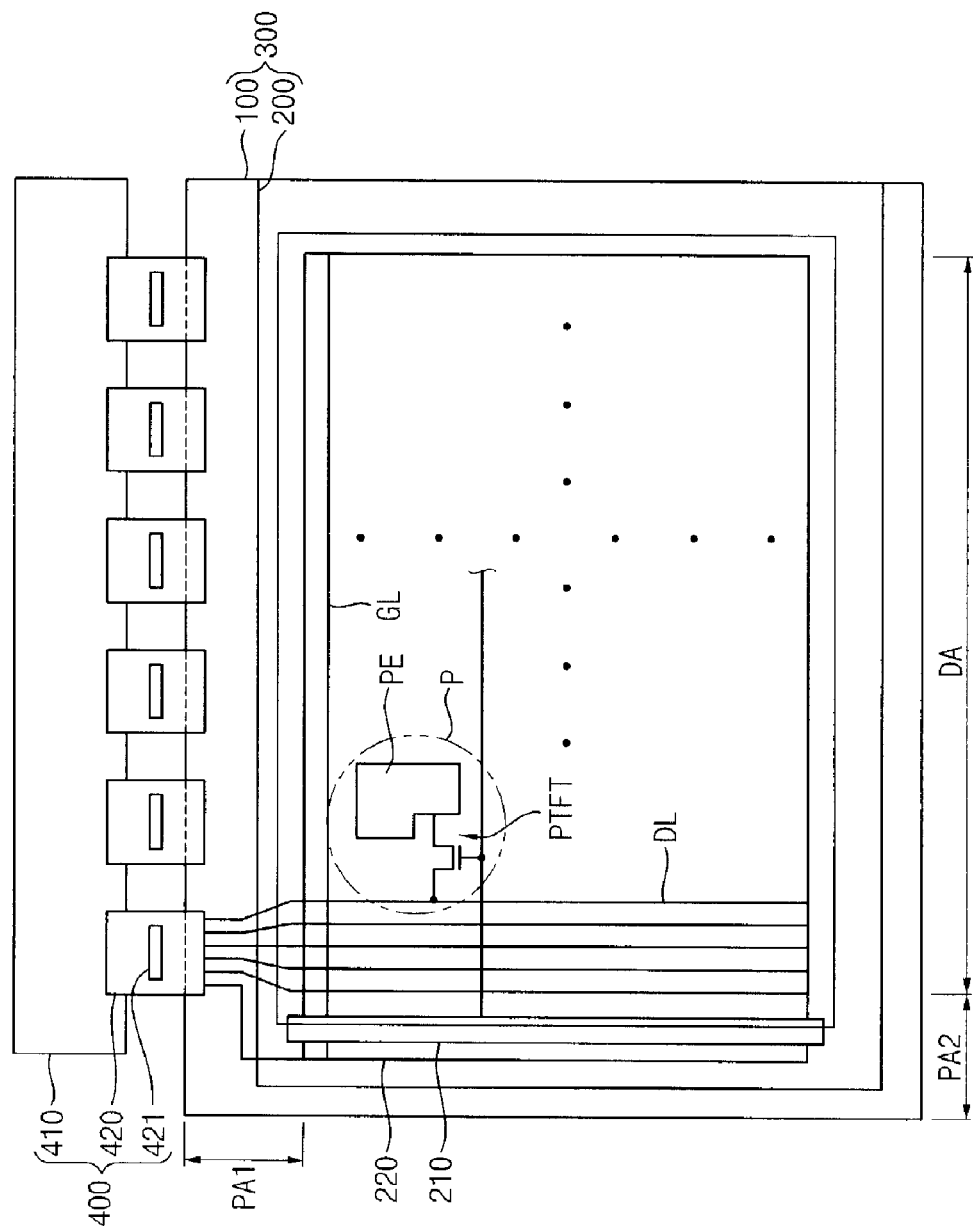
FIG. 1 is a plan view showing a display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the exemplary embodiments of the present invention will be explained in detail with reference to the accompanying drawings.

Figure 2:
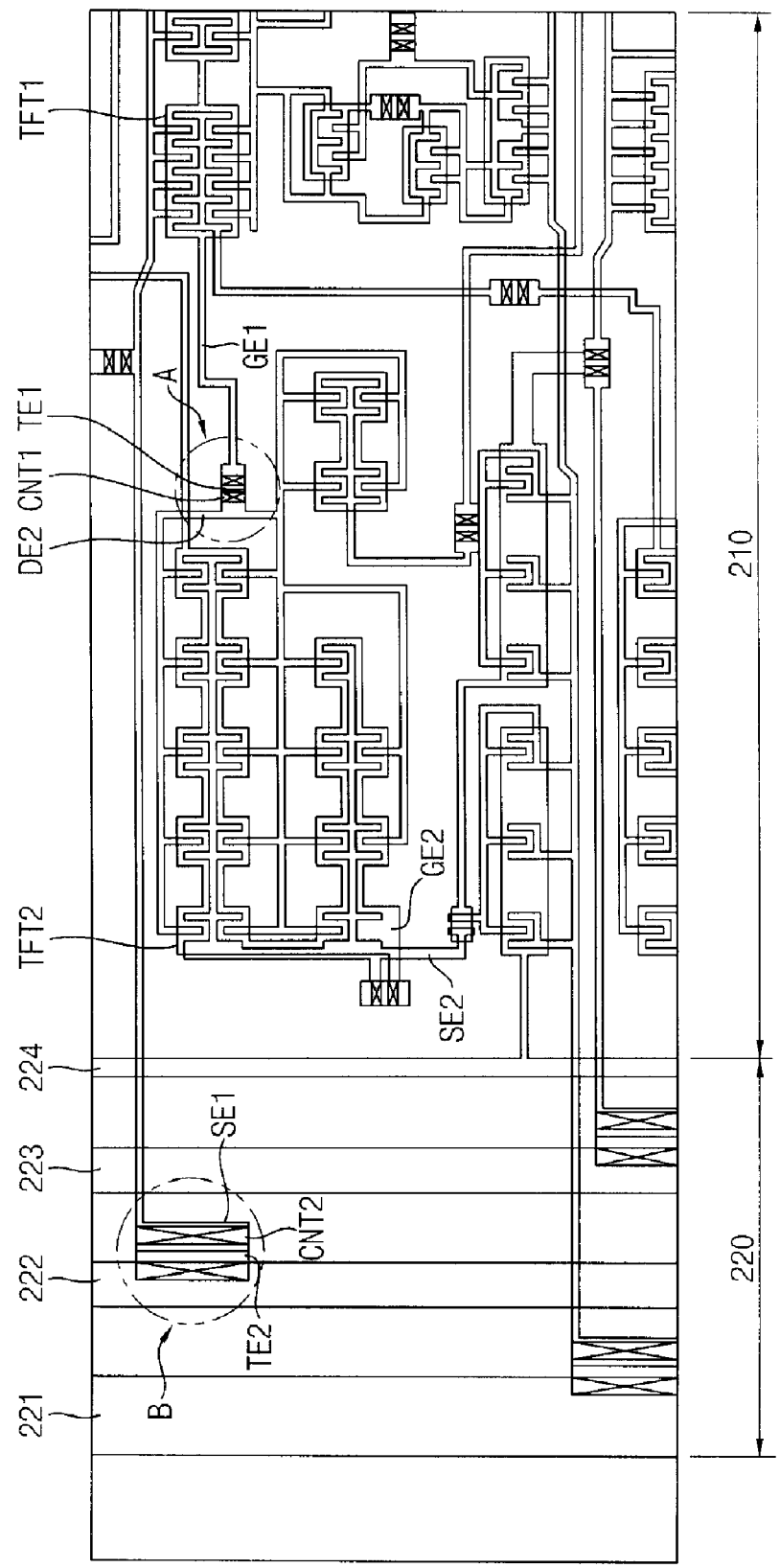
FIG. 2 is a layout partially showing the gate driver shown in FIG. 1.

FIG. 1 is a plan view showing a display apparatus according to an exemplary embodiment of the present invention. FIG. 2 is a layout partially showing a gate driver shown in FIG. 1.

Referring to FIG. 1, a display apparatus 600 according to an exemplary embodiment of the present invention includes a display panel 300 displaying an image and a source driver 400 connected to the display panel 300.

The display panel 300 includes a display substrate 100, an opposing substrate 200 opposite the display substrate 100, and a liquid crystal layer (not shown) disposed between the display substrate 100 and the opposing substrate 200. The display substrate 100 includes a display area DA that overlaps the opposing substrate 200 and displays an image and a first peripheral area PA1 and a second peripheral area PA2 that surround the display area DA.

The display substrate 100 includes gate lines GL, source lines DL, a switching element PTFT, and a pixel electrode PE, which are formed on the display area DA. The gate lines GL extend in a first direction. The source lines DL extend in a second direction substantially perpendicular to the first direction. A plurality of pixels P is included in the display area DA. The pixel electrode PE is formed in each pixel P. The pixel electrode PE contacts a first contact electrode (not shown) connected to a drain electrode (not shown) of the switching element PTFT. Therefore, the pixel electrode PE is connected to the switching element PTFT.

The source driver 400 is disposed in the first peripheral area PA1 of the display substrate 100 and applies a data signal to the source lines DL. The source driver 400 includes a printed circuit board (PCB) 410 having a driving circuit integrated thereon and a flexible PCB (FPCB) 420 connecting the PCB 410 to the display panel 300. The FPCB 420 includes a source driving chip 421 disposed thereon. A first edge portion of the FPCB 420 is connected to the first peripheral area PA1 and a second edge portion of the FPCB 420, which is opposite the first edge portion, is connected to the PCB 410.

A gate driver is mounted on the second peripheral area PA2 of the display substrate 100. The gate driver includes a gate circuit part 210 and a signal line part 220. The gate driver is formed through a process for forming the gate lines GL, the source lines DL, and the switching element PTFT.

Referring to FIG. 2, the gate circuit part 210 includes a plurality of transistors. The transistors are connected to each other through a transparent electrode pattern. For example, the signal line part 220 may include a first signal line 221, a second signal line 222, a third signal line 223, and a fourth signal line 224. The first signal line 221 receives a gate voltage VSS in response to a driving signal of the gate circuit part 210. The second signal line 222 receives a first clock signal CK. The third signal line 223 receives a second clock signal CKB. The fourth signal line 224 receives the gate voltage VSS.

For example, the gate circuit part 210 may include a first transistor TFT1 and a second transistor TFT2. The first transistor TFT1 includes a first gate electrode GE1, a source electrode SE1, and a first drain electrode (not shown). The first source electrode SE1 is disposed on the first gate electrode GE1. The first drain electrode is disposed on the first gate electrode GE1 and spaced apart from the first source electrode SE1. The second transistor TFT2 includes a second gate electrode GE2, a second source electrode SE2, and a second drain electrode DE2. The second source electrode SE2 is disposed on the second gate electrode GE2 and spaced apart from the second drain electrode DE2.

The first transistor TFT1 and the second transistor TFT2 are connected to each other. The first transistor TFT1 is connected to the second signal line 222. In detail, the first gate electrode GE1 is connected to a second contact electrode CNT1, which is connected to the second drain electrode DE2, through a first transparent electrode pattern TE1. A third contact electrode CNT2, which is connected to the first source electrode SE1, is connected to the second signal line 222 of the signal line part 220 through a second transparent electrode pattern TE2.

Referring again to FIG. 1, the opposing substrate 200 is opposite the display substrate 100. The opposing substrate 200 is coupled with the display substrate 100 to provide a space in which the liquid crystal layer is disposed. The opposing substrate 200 includes a plurality of color filters and a common electrode (not shown). The color filters respectively correspond to the pixels P. The common electrode is opposite the pixel electrode PE and receives a common voltage.

Figure 3:
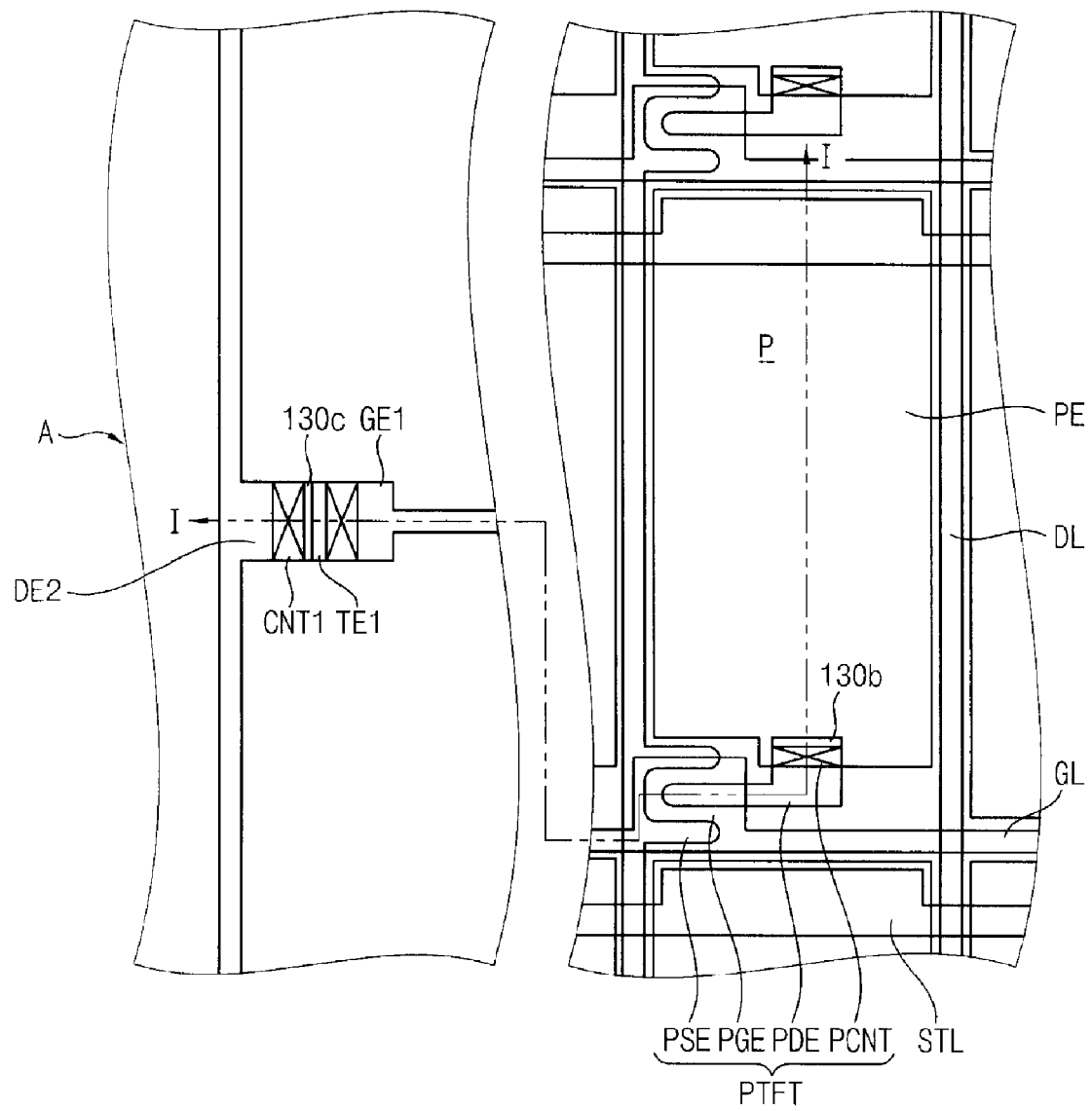
FIG. 3 is an enlarged plan view of region A shown in FIG. 2 and the pixel region shown in FIG. 1.

FIG. 3 is an enlarged plan view of region A shown in FIG. 2 and the pixel region shown in FIG. 1. FIG. 4 is a cross-sectional view taken along line I-I' shown in FIG. 3.

Referring to FIG. 1 and FIG. 4, the switching element PTFT and the pixel electrode PE are formed in the pixel P of the display area DA. The switching element PTFT is connected to the gate line GL and the source line DL. The pixel electrode PE is connected to a storage line STL arranged substantially parallel to the gate line GL and the switching element PTFT.

The switching element PTFT includes a gate electrode PGE, a source electrode PSE, a drain electrode PDE, and a first contact electrode PCNT. The gate electrode PGE is connected to the gate line GL. The source electrode PSE is connected to the source line DL and disposed on the gate electrode PGE. The drain electrode PDE is disposed on the gate electrode PGE and spaced apart from the source electrode PSE. The first contact electrode PCNT is connected to an end portion of the drain electrode PDE and contacts the pixel electrode PE. The switching element PTFT is connected to the pixel electrode PE through the first contact electrode PCNT. A gate insulating layer 120 is formed on a base substrate 110 having the gate line GL and the gate electrode PGE formed thereon. A passivation layer 160 is formed on the base substrate 110 having the source line DL, the source electrode PSE, and the drain electrode PDE formed thereon.

A semiconductor pattern 130a is formed on the gate insulating layer 120. The semiconductor pattern 130a corresponds to the source electrode PSE, the drain electrode PDE, and the first contact electrode PCNT and is formed under the source electrode PSE, the drain electrode PDE, and the first contact electrode PCNT. The semiconductor pattern 130a extends to contact an end portion of the first contact electrode PCNT and includes a first protrusion 130b protruding beyond the first contact electrode PCNT. The first contact electrode PCNT is disposed on the first protrusion 130b to form a step against an upper surface of the first protrusion 130b. The semiconductor pattern 130a includes a semiconductor layer 132 and an ohmic contact layer 134, which are sequentially stacked on the gate insulating layer 120.

The pixel electrode PE contacts the first contact electrode PCNT to be connected to the switching element PTFT. The pixel electrode PE extends from the first contact electrode PCNT along the first protrusion 130b to contact an upper surface of the base substrate 110 of the display region DA. The pixel electrode PE covers the first protrusion 130b.

The storage line STL is formed from a gate metal layer and parallels the gate line. The gate insulating layer 120 is disposed on the storage line STL. The pixel electrode PE is formed on the gate insulating layer 120 at a position corresponding to the storage line STL.

The first gate electrode GE1 of the first transistor TFT1 is formed on the base substrate corresponding to the second peripheral area PA2 of the display substrate 100. The first gate electrode GE1 is formed from a gate metal layer from which the gate line GL and the gate electrode PGE are formed. The gate insulating layer 120 and the passivation layer 160 are sequentially formed on the first gate electrode GE1. The gate insulating layer 120 and the passivation layer 160 are partially removed to expose an end portion of the first gate electrode GE1.

The second drain electrode DE2 and the second contact electrode CNT1 are formed on the semiconductor pattern 130a, which is formed on the gate insulating layer 120. The second drain electrode DE2 and the second contact electrode CNT1 are formed from the source metal layer from which the source line DL is formed. The semiconductor pattern 130a extends to contact an end portion of the second contact electrode CNT1 and includes a second protrusion 130c protruding beyond the second contact electrode CNT1. The second contact electrode CNT1 is disposed on the second protrusion 130c to form a step against an upper surface of the second protrusion 130c. The passivation layer 160 is formed on the second drain electrode DE2. The second contact electrode CNT1 and the second protrusion 130c are exposed.

The second contact electrode CNT1 and the second protrusion 130c contact the first transparent electrode pattern TE1. The first transparent electrode pattern TE1 extends from the second contact electrode CNT1 along the second protrusion 130c to contact an upper surface of the base substrate 110. The first transparent electrode pattern TE1 extends to contact an end portion of the first gate electrode GE1. The second drain electrode DE2 and the first gate electrode GE1 are connected to each other through the first transparent electrode pattern TE1.

Figure 5A:
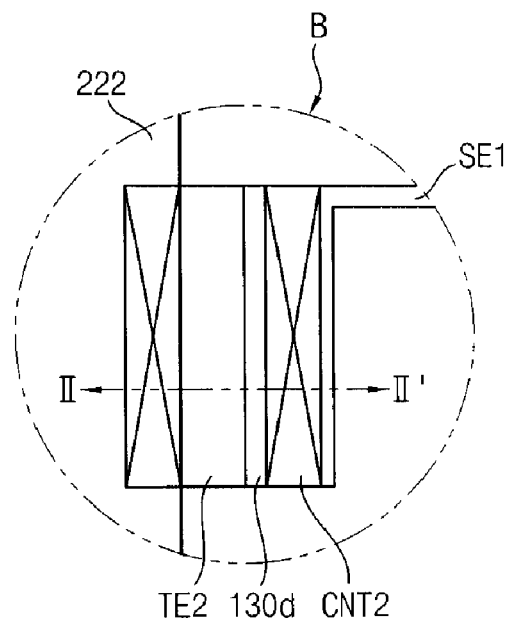
FIG. 5A is an enlarged plan view of region B shown in FIG. 2.
Figure 5B:
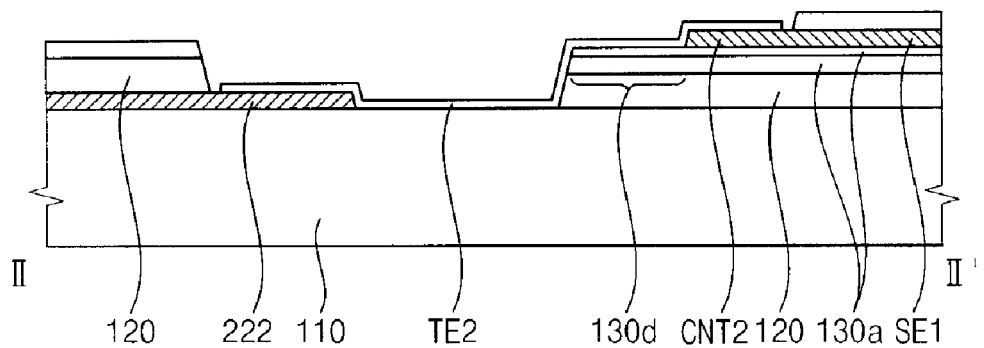
FIG. 5B is a cross-sectional view taken along line II-II' shown in FIG. 5A.

FIG. 5A is an enlarged plan view of region B shown in FIG. 2. FIG. 5B is a cross-sectional view taken along line II-II' shown in FIG. 5A.

Referring to FIG. 2, FIG. 5A, and FIG. 5B, the second signal line 222 of the signal line part 220 is connected to the third contact electrode CNT2, which is connected to the first source electrode SE1 of the first transistor TFT1, through the second transparent electrode pattern TE2.

The second signal line 222 is formed in the second peripheral area PA2 of the base substrate 110. The second signal line 222 is formed from the gate metal layer. The gate insulating layer 120 and the passivation layer 160 are sequentially formed on the second signal line 222. The gate insulating layer 120 and the passivation layer 160 are partially removed to partially expose an end portion of the second signal line 222. The first source electrode SE1 and the third contact electrode CNT2 are formed from the source metal layer. The first source electrode SE1 and the third contact electrode CNT2 are formed on the semiconductor pattern 130a.

A third protrusion 130d protrudes from an end portion of the third contact electrode CNT2. The third contact electrode CNT2 is disposed on the third protrusion 130d to form a step against an upper surface of the third protrusion 130d. The passivation layer 160 is formed on the first source electrode SE1. The third contact electrode CNT2 and the third protrusion 130d are exposed. The second transparent electrode pattern TE2 extends along the third contact electrode CNT2 and the third protrusion 130d to contact the upper surface of the base substrate 110. The first source electrode SE1 is connected to the second signal line 222 through the second transparent electrode pattern TE2.

In processes for manufacturing the display substrate 100, when the first protrusion 130b, the second protrusion 130c, and the third protrusion 130d are formed, an overlay margin between the display substrate and masks used in photo processes may be ensured, and thus the reliability of the photo processes may be enhanced. Therefore, the reliability of the processes for manufacturing the display substrate 100 may be enhanced.

In FIG. 1 to FIG. 5B, the protrusions are applied, for example, to a switching element in the display area and the transistors in a peripheral area. However, the protrusions may be applied to a structure in which a contact electrode of metal electrode formed from the source metal layer contacts an optical electrode pattern formed from a transparent electrode layer.

FIG. 6, FIG. 7A, FIG. 7B, FIG. 7C, FIG. 7D, FIG. 7E, FIG. 7F, FIG. 8A, FIG. 8B, FIG. 8C, FIG. 8D, and FIG. 8E are cross-sectional views showing a process for manufacturing the display substrate shown in FIG. 4.

The display substrate shown in FIG. 4 includes a pixel region formed in a display area and a second peripheral area. Hereinafter, the pixel region will be divided into a first source region, a channel region, a first drain region, a first contact region, a first end region, and a first protrusion region, and the second peripheral area will be divided into a second drain region, a second contact region, a second end region, and a second protrusion region. A source electrode of a switching element is formed in the first source region. A drain electrode of the switching element is formed in the first drain region. A second drain electrode of a second transistor formed in the second peripheral area is formed in the second drain region.

Referring to FIG. 6, a gate metal layer (not shown) formed on a base substrate 110 is patterned using a first mask to form a gate pattern.

For example, the gate metal layer may be formed on the base substrate 110. The gate metal layer may be formed using a metal material. The metal material may include chromium (Cr), aluminum (Al), tantalum (Ta), molybdenum (Mo), titanium (Ti), tungsten (W), copper (Cu), silver (Ag), etc. These materials may be used alone or in combinations thereof. The gate metal layer may include two layers having different physical and chemical properties from each other. For example, the gate metal layer may be formed on the base substrate 110 through a sputtering process.

The gate metal layer may be etched through a photo process using the first mask to form a gate pattern. The gate pattern includes a gate electrode GE of the switching element, a storage line STL of the switching element, and a first gate electrode GE1 of a first transistor. Even though not shown in FIG. 6, the gate pattern may include a gate line connected to the gate electrode GE of the switching element and a second gate electrode of a second transistor.

Referring to FIG. 6 and FIG. 7A, a gate insulating layer 120, a channel layer 132 and 134, and a source metal layer 140 are sequentially formed on the base substrate 110 having the gate pattern formed thereon. Then, a first photoresist pattern 150*a* and 150*b* is formed on the source metal layer 140.

For example, the gate insulating layer 120 may be formed on the base substrate 110 having the gate pattern formed thereon. The gate insulating layer 120 may be formed using silicon nitride ($SiN_x$) and may be formed through a plasma-enhanced chemical vapor deposition (PECVD) method.

The channel layer 132 and 134 is formed on the gate insulating layer 120. The channel layer includes a semiconductor layer 132 and an ohmic contact layer 134 sequentially stacked on the gate insulating layer 120. The semiconductor layer 132 may be formed using amorphous silicon. The ohmic contact layer 134 may be formed using amorphous silicon doped with an n-type impurity at high concentration. For example, the channel layer 132 and 134 may be formed through a PECVD method.

The source metal layer 140 is formed on the channel layer 132 and 134. For example, the source metal layer 140 may be formed using metal. The metal may include chromium (Cr), aluminum (Al), tantalum (Ta), molybdenum (Mo), titanium (Ti), tungsten (W), copper (Cu), silver (Ag), etc. These metals may be used alone or in combinations thereof. The source metal layer 140 may include two metal layers having different physical and chemical properties from each other. The source metal layer 140 may be formed on the channel layer 132 and 134 through a sputtering process.

Figure 7B:
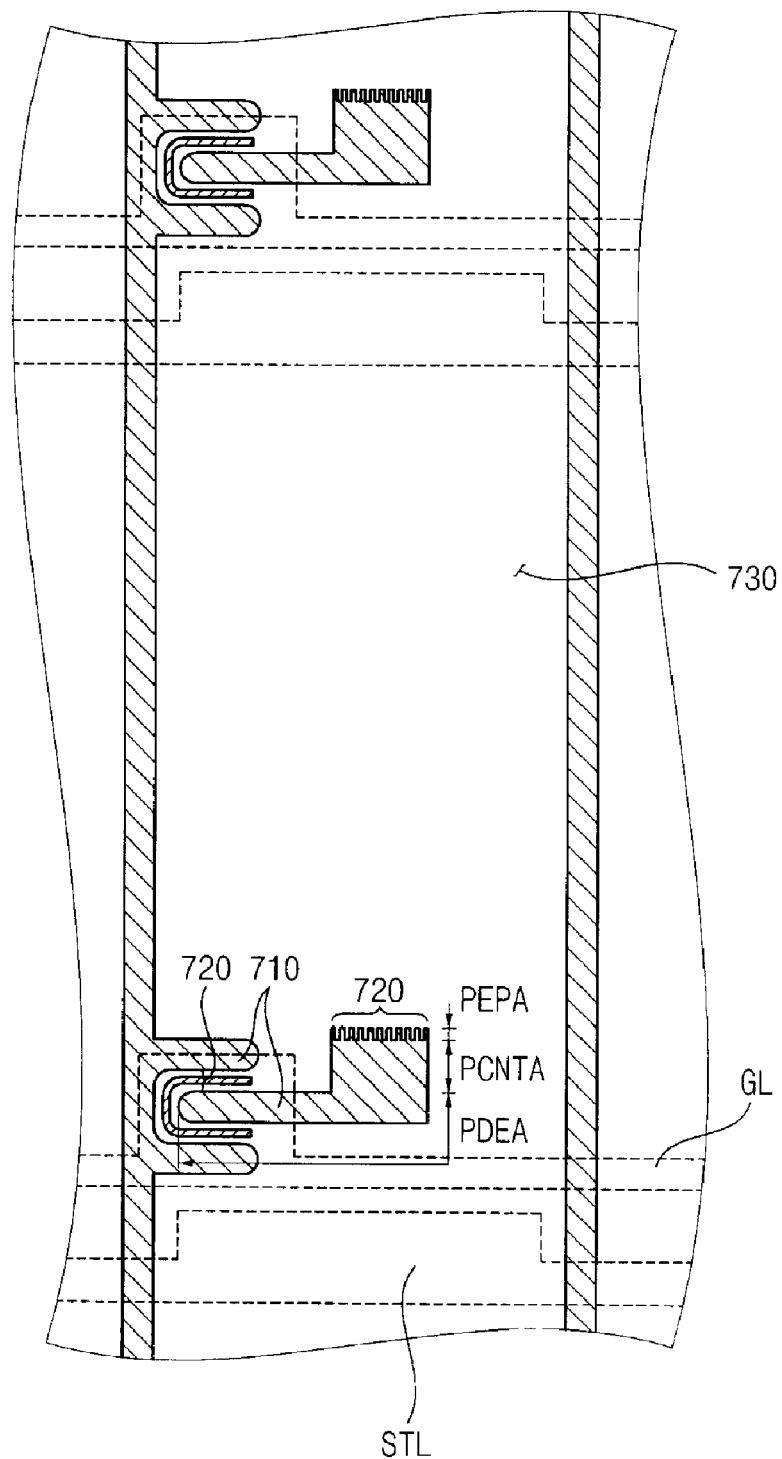

Referring to FIG. 7A and FIG. 7B, a first photoresist film (not shown) is formed on the source metal layer 140. Then, a second mask MASK2 is disposed over the base substrate 110 to form a first photoresist pattern 150*a* and 150*b*. The first photoresist film is formed using a positive photoresist material of which a portion exposed to light is removed by a developing solution.

The second mask MASK2 includes a light blocking part 710, a half transmission part 720, and a light transmission part 730. For example, the second mask MASK2 may be designed to pattern the positive photoresist material. The second mask MASK2 may be a slit mask including a slit pattern.

The light blocking part 710 is disposed in an upper portion of the second mask MASK2 and blocks light irradiated to the base substrate 110. The light blocking part 710 is disposed in an area corresponding to the first source region PSEA, the first drain region PDEA, and the first contact region PCNTA. The light blocking part 710 is also disposed in an area corresponding to that in which the source line crosses the gate line GL. The light blocking part 710 is also disposed in an area corresponding to the second drain region DEA and the second contact region CNTA.

The half transmission part 720 has a slit pattern formed therein. Light passing through the half transmission part 720 is diffracted and diffused by the slit pattern. The half transmission part 720 is disposed in an area corresponding to the channel region CHA and the first end region PEPA extending from the first contact region PCNTA. The half transmission part 720 is also disposed in an area corresponding to the second end region EPA extended from the second contact region CNTA.

The light transmission part 730 is disposed in an upper portion of the second mask MASK2. The light transmission part 730 transmits light irradiated onto the base substrate 110. The light transmission part 730 is disposed in the area of the second mask MASK2 where the light blocking part 710 and the half transmission part 720 are not formed.

The transmissivity of light passing through the half transmission part 720 is greater than the transmissivity of light passing through the light blocking part 710 and is smaller than the transmissivity of light passing through the light transmission part 730. Accordingly, when the first photoresist film is exposed and developed, the first photoresist film corresponding to the half transmission part 720 becomes thinner than the first photoresist film corresponding to the light blocking part 710 and thicker than the first photoresist film corresponding to the light transmission part 730.

The first photoresist film is exposed and developed to form the first photoresist pattern 150*a* and 150*b*. A first portion of the first photoresist pattern 150*a* and 150*b* corresponding to the light blocking part 710 has a first thickness 'a' and is referred to as a first thickness region 150*a*. The first thickness region 150*a* is formed in the first source region PSEA, the first drain region PDEA, the first contact region PCNTA, the second drain region DEA, and the source metal layer of the second contact region CNTA. A second portion of the first photoresist pattern 150*a* and 150*b* corresponding to the half transmission part 720 has a second thickness 'b' and is referred to as a second thickness region 150b. The second thickness region 150b is formed in the first end region PEPA, the second end region EPA, and the source metal layer of the channel region CHA.

The first thickness 'a' of the first thickness region 150a is thicker than the second thickness b of the second thickness region 150b. An amount of light passing through the half transmission part 720 is greater than an amount of light passing through the light blocking part 710 and smaller than an amount of light passing through the light transmission part 730. Accordingly, the second thickness b is thinner than the first thickness 'a'.

In another exemplary embodiment of the present invention, the first photoresist film may be formed using a negative photoresist material having a portion exposed to light that is hardened and remains and a portion unexposed to light that is removed by a developing solution. When the first photoresist film is formed using the negative photoresist material, the light blocking part 710 and the light transmission part 730 are switched with each other.

Figure 7C:
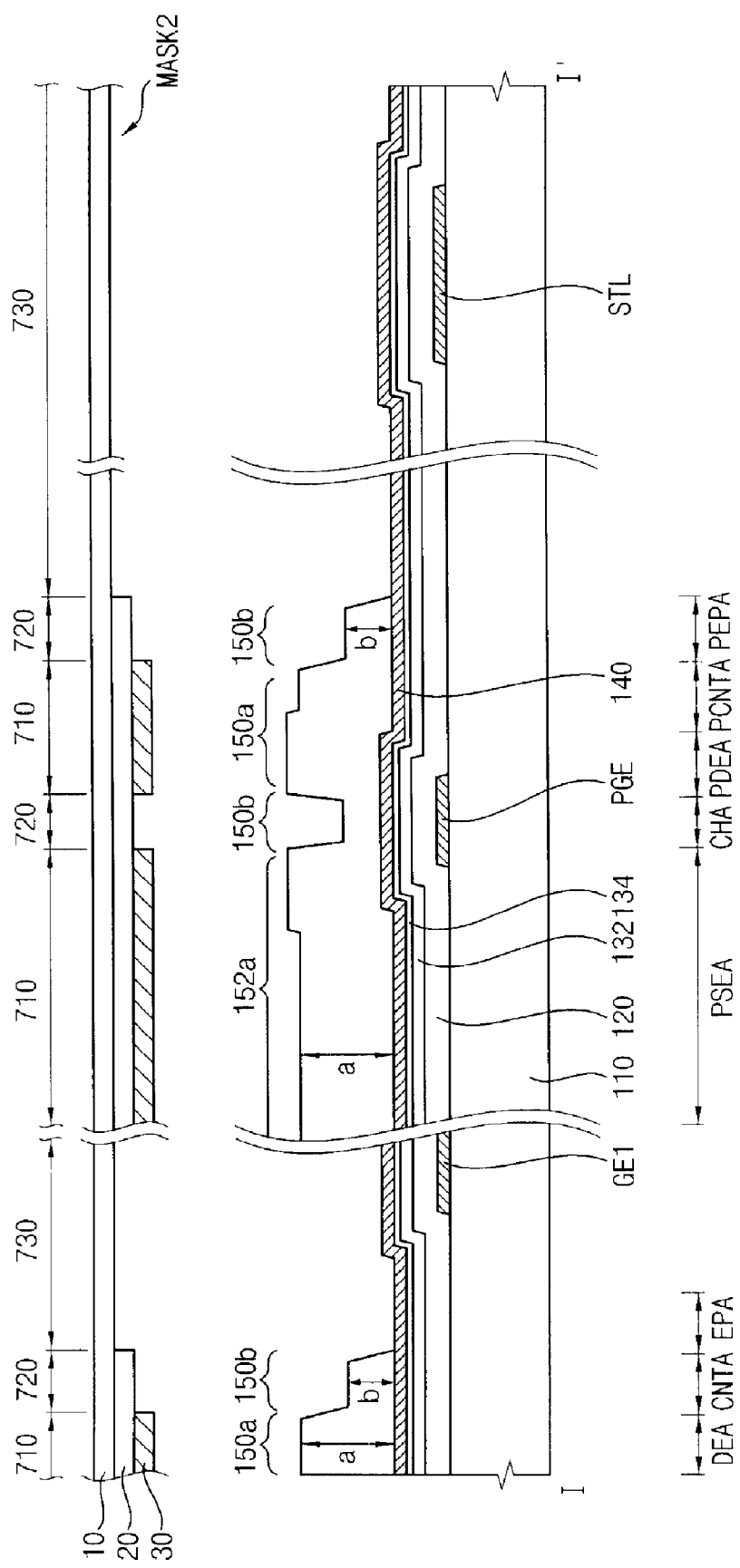
Figure 7D:
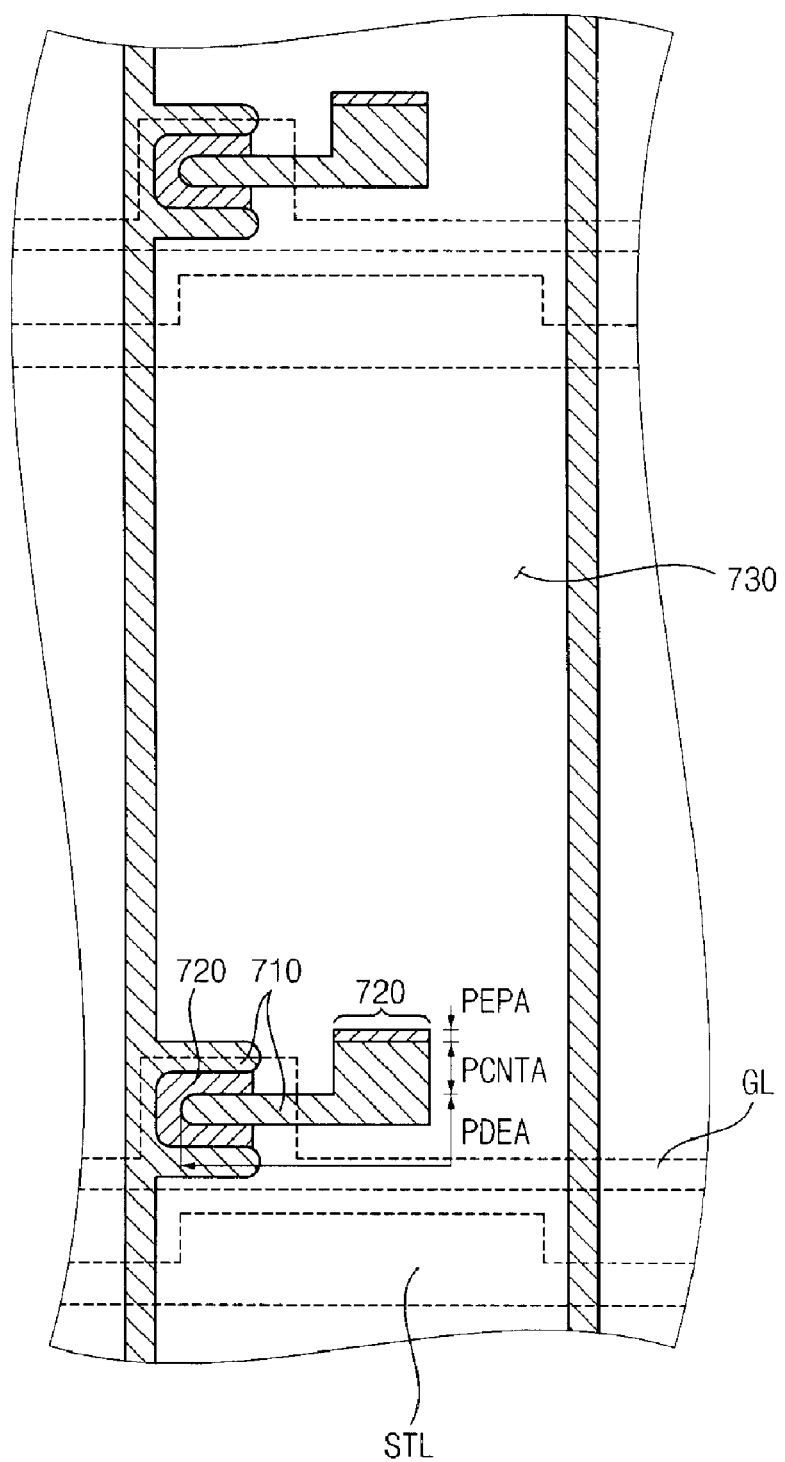

Referring to FIG. 7C and FIG. 7D, the second mask MASK2 may alternatively be a halftone mask. The second mask MASK2 includes a light blocking part 710, a half transmission part 720, and a light transmission part 730. The second mask MASK2 includes a transparent substrate 10, a half transmission layer 20 disposed on the transparent substrate 10 to transmit light by half of light irradiated onto the half transmission layer 20, and a light blocking layer 30 that is disposed on the transparent substrate 10 and fully blocks light irradiated onto the light blocking layer 30. The light blocking part 710, the half transmission part 720, and the light transmission part 730 are defined by the half transmission layer 20 and the light-blocking layer 30.

The transparent substrate 10 is formed using a transparent material. The transparent substrate 10 fully transmits light irradiated onto the transparent substrate 10. The half transmission layer 20 is disposed on the transparent substrate 10 and partially transmits light passing through the transparent substrate 10. For example, the half transmission layer 20 may be formed using molybdenum silicon (Mo—Si). The light blocking layer 30 is disposed on the half transmission layer 20 and blocks light passing through the transparent substrate 10. For example, the light blocking layer 30 may be formed using chromium (Cr).

The light blocking part 710 corresponds to a region in which the half transmission layer 20 and the light blocking layer 30 are sequentially stacked on the transparent substrate 10. The light blocking part 710 is disposed correspondingly to the first source region PSEA, the first drain region PDEA, and the first contact region PCNTA. The light blocking part 710 is also disposed in the area corresponding to where the source line crosses the gate line GL. The light blocking part 710 is also disposed in an area corresponding to the second drain region DEA and the second contact region CNTA.

The half transmission part 720 corresponds to a region in which the half transmission layer 20 is disposed on the transparent substrate 10. The half transmission part 720 is disposed in an area corresponding to the channel region CHA and the first end region PEPA. The half transmission part 720 is also disposed in an area corresponding to the second end region EPA.

The light transmission part 730 is disposed in an area of the second mask MASK2 where the light blocking part 710 and the half transmission part 720 are not formed. When the first photoresist film is formed using the negative photoresist material, areas in which the light blocking part 710 and the light transmission part 730 are formed are switched with each other.

Referring to FIG. 7B and FIG. 7E, the source metal layer 140 and the channel layer 132 and 134 are patterned through an etching process using the first photoresist pattern 150a and 150b. Then, the first photoresist pattern 150a and 150b is etched back to form a first remaining pattern 152, which is the portion of the first thickness region 150a that partially remains.

In detail, the source metal layer 140 may be patterned through a wet etching process using the first photoresist pattern 150a and 150b as a mask. The source metal layer 140 is patterned to form a first switching pattern 142, a first contact electrode PCNT, and a first contact end portion EP1. The first switching pattern 142 is formed in the first source region PSEA, the channel region CHA, and the drain region PDEA. The first contact electrode PCNT is connected to the first switching pattern 142 and formed in the first contact region PCNTA. The first contact end portion EP1 is connected to the first contact electrode PCNT and formed in the first end region PEPA. During the wet etching process, the source line (not shown) connected to the first switching pattern 142 is also formed.

The source metal layer 140 is patterned to form a second switching pattern 144, a second contact electrode CNT1, and a second contact end portion EP2. The second switching pattern 144 is formed in the second drain region DEA. The second contact electrode CNT1 is connected to the second switching pattern 144 and formed in the second contact region CNTA. The second contact end portion EP2 is connected to the second contact electrode CNT1 and formed in the second end region EPA.

The channel layer 132 and 134 is patterned through an etching process using the patterned source metal layer as a mask to form a semiconductor pattern 130a. For example, the semiconductor pattern 130a may be formed through a dry etching process. The semiconductor pattern 130a and the patterned source metal layer have substantially the same outline.

Then, the first photoresist pattern 150a and 150b is etched back to form the first remaining pattern 152. For example, the first remaining pattern 152 may be formed through, for example, an ashing process using oxygen plasma. As a result, the second thickness region 150b is removed and the first thickness region 150a gets thinner. The first contact end portion EP1 and the second contact end portion EP2 are exposed through the first remaining pattern 152 since the second thickness region 150b is removed. Even though not shown in FIG. 7B and FIG. 7E, the second semiconductor pattern 144 formed at a channel region of the second transistor is also exposed. For example, the first remaining pattern 152 may have a third thickness 'c' that is substantially the same as the difference between the first thickness 'a' and the second thickness 'b'.

Figure 7F:
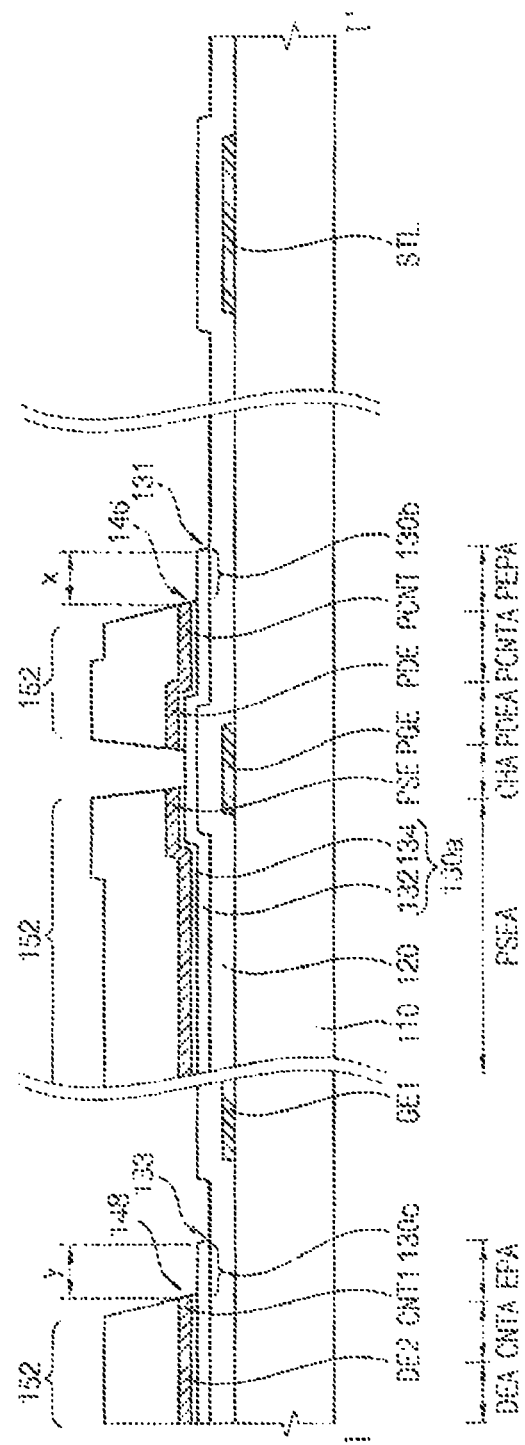

Referring to FIG. 7E and FIG. 7F, the first contact end portion EP1 is removed to form a first protrusion 130b, and the second contact end portion EP2 is removed to form a second protrusion 130c.

In detail, the first and second switching patterns 142 and 144 may be wet-etched using the first remaining pattern 152 as a mask. Accordingly, the first contact end portion EP1 is removed to expose an end portion 146 of the first contact electrode PCNT and the first protrusion 130b protruding beyond the end portion 146 of the first contact electrode PCNT is formed. The channel layer 132 extends as far as the first end region PEPA to form the first protrusion 130b.

The second contact end portion EP2 is removed to expose an end portion 148 of the second contact electrode CNT1 and form the second protrusion 130c protruding beyond the end portion 148 of the second contact electrode CNT1. The channel layer 132 extends as far as the second end region EPA to form the second protrusion 130c.

The first protrusion 130b may protrude beyond the end portion 146 of the first contact electrode PCNT by a first protrusion length X. For example, the first protrusion length X may be about 6 μm. The first protrusion length X is defined as a length between the end portion 146 of the first contact electrode PCNT and an end portion 131 of the first protrusion 130c. The second protrusion 130c may protrude beyond the end portion 148 of the second contact electrode CNT1 by a second protrusion length Y. For example, the second protrusion length Y may be about 6 μm.

The first switching pattern 142 of the channel region CHA is removed to form the source electrode PSE and the drain electrode PDE of the switching element. The source electrode PSE is spaced apart from the drain electrode PDE. Then, the second drain electrode DE2 of the second transistor is formed. Even though not shown in FIG. 7E and FIG. 7F, the second switching pattern 144 is partially removed to form the source electrode SE2 of the second transistor spaced apart from the second drain electrode DE2.

When outlines of end portions 146 and 148 of the first and second contact electrode PCNT and CNT1 are substantially the same as outlines of end portions (not shown) of the channel layer 132 and 134, respectively, the first and second contact electrodes PCNT and CNT1 form a step with respect to an upper surface of the gate insulating layer 120 and the end portions of the first and second contact electrodes PCNT and CNT1 are steeply inclined against the upper surface of the gate insulating layer 120. Accordingly, the margin of a following photo process using a third mask may be decreased.

According to an exemplary embodiment of the present invention, the first protrusion 130b and the first contact electrode PCNT may be gently inclined against the upper surface of the gate insulating layer 120, and the second protrusion 130c and the second contact electrode CNT1 may also be gently inclined against the upper surface of the gate insulating layer 120. Accordingly, the margin of the photo process using the third mask may be enhanced.

In the following process for forming a channel part, the first and second protrusions 130b and 130c may be removed to have a shorter length than intended. Particularly, the intended length of the first protrusion 130b is substantially the same as the first protrusion length X that is substantially the same as a length of the removed first contact end portion EP1. However, the first protrusion 130b is partially removed during the process for forming the channel part and a length of the formed first protrusion 130b may be shorter than the first protrusion X. In order to solve the above-mentioned problem, an area of a portion in which the half transmission part 720 of the second mask is formed may be enlarged so that the first contact end portion EP1 has a protruding length greater than the first protrusion length X.

Figure 8A:
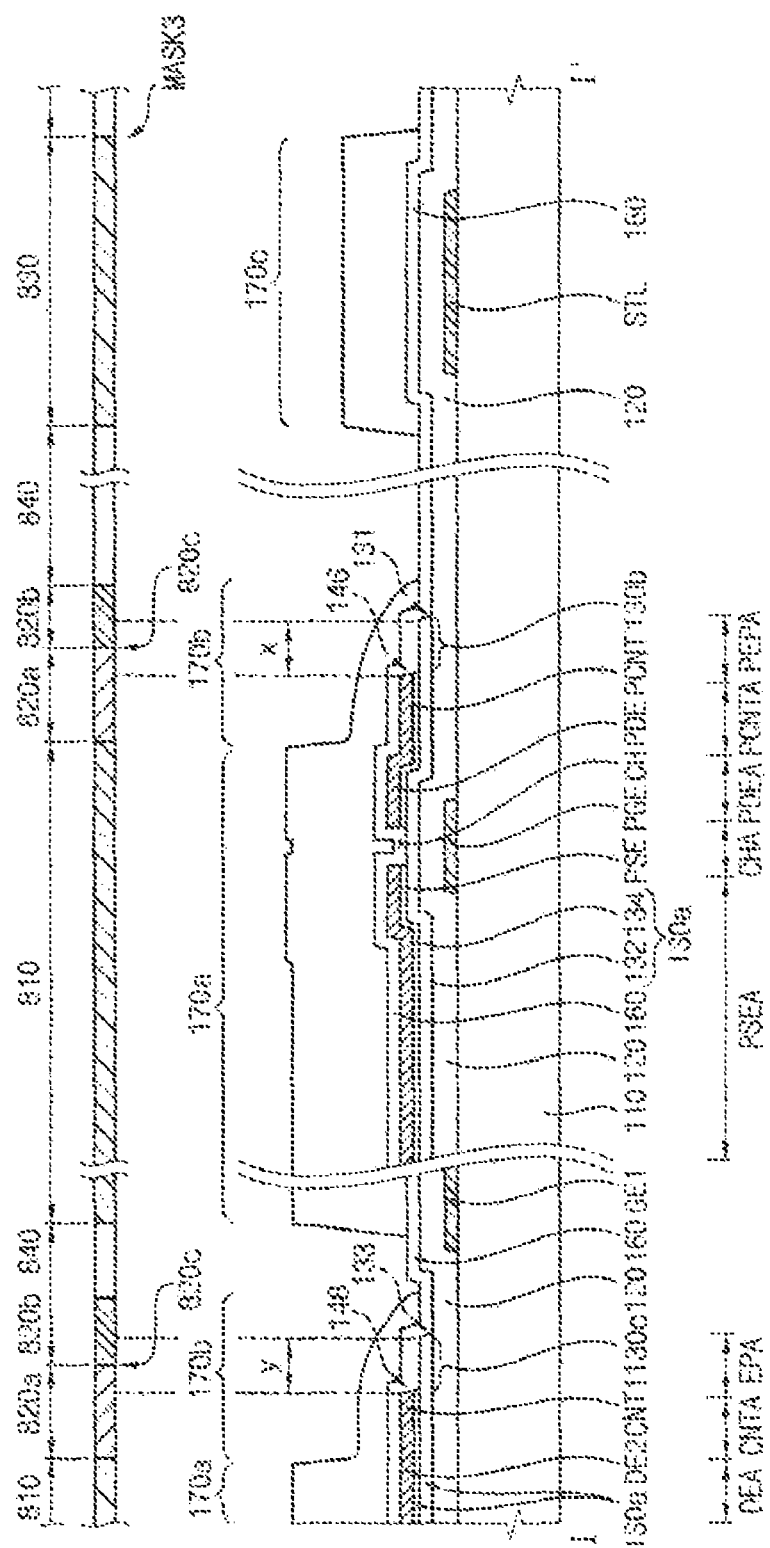
Figure 8B:
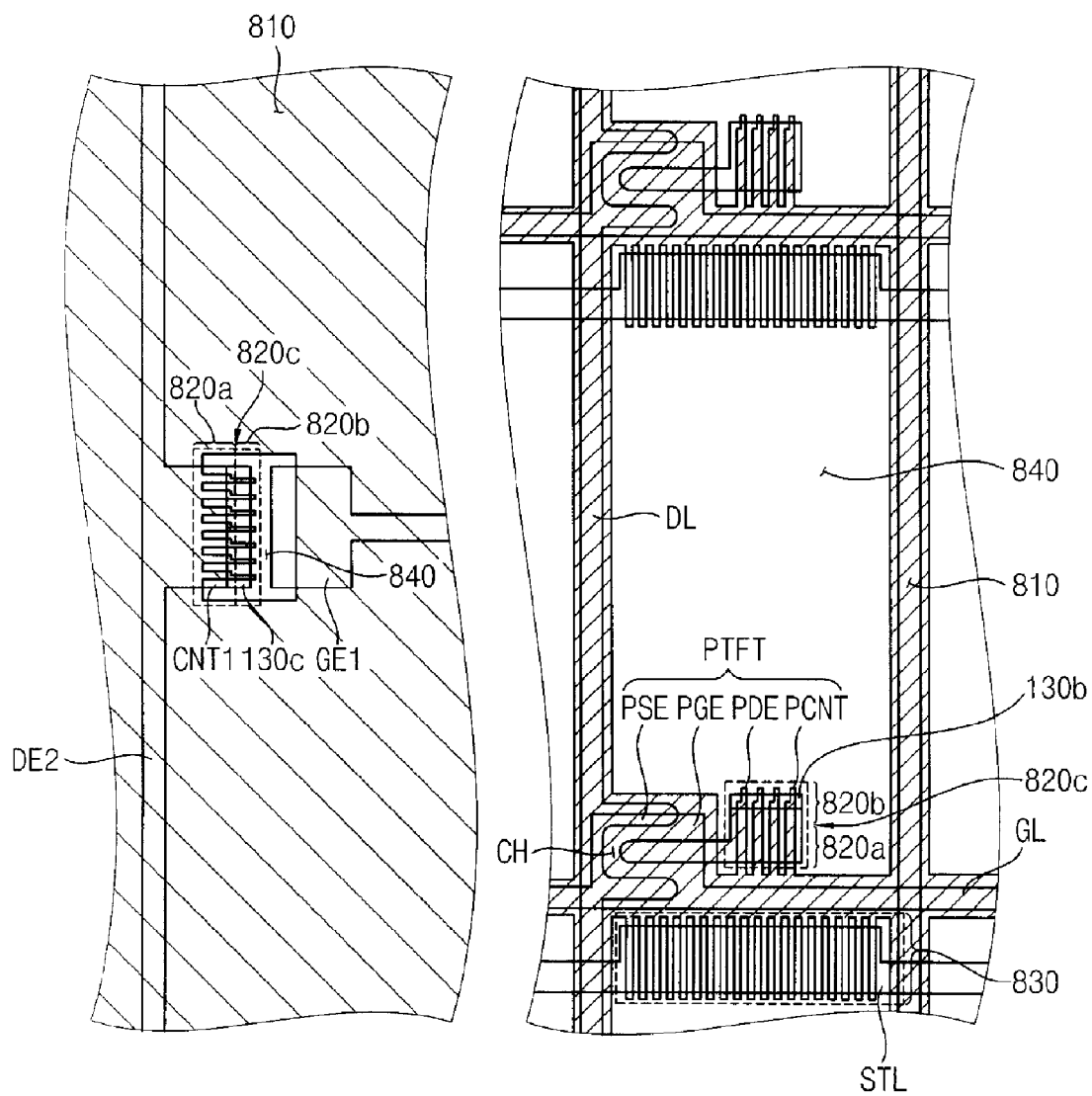

Referring to FIG. 7F, FIG. 8A, and FIG. 8B, a channel part CH of the switching element is formed. A passivation layer 160 is formed on the base substrate 110 having the channel part CH formed thereon. Then, second photoresist patterns 170a, 170b, and 170c are formed on the passivation layer 160.

In detail, the ohmic contact layer 132 of the channel region CHA is removed through an etching process using the source electrode PSE and the drain electrode PDE as a mask. The etching process may be a dry etching process. Accordingly, the channel part CH of the switching element is formed to expose the semiconductor layer 132 of the channel region CHA. After the channel part CH is formed, the first remaining pattern 152 is removed. For example, the first remaining pattern 152 may be removed through, for example, an ashing process using oxygen plasma.

Then, the passivation layer 160 and a second photoresist film (not shown) may be sequentially formed. For example, the passivation layer 160 may be formed using silicon nitride ($SiN_x$), silicon oxide ($SiOx$), etc. The passivation layer 160 may be formed on the base substrate 110 having the channel part CH formed thereon through a PECVD method. The second photoresist film may be formed using the positive photoresist material.

The second photoresist film is patterned through a process using the third mask MASK3 to form the second photoresist patterns 170a, 170b, and 170c. The third mask MASK3 includes a light blocking part 810, a double half transmission part 820a and 820b, a single half transmission part 830, and a light transmission part 840. The third mask MASK3 may be a slit mask such that the double half transmission part 820a and 820b and the single half transmission part 830 include slit patterns. Alternately, the third mask MASK3 may be a half-tone mask such that the double half transmission part 820a and 820b and the single half transmission part 830 may be treated to partially transmit light irradiated onto the third mask MASK3. Hereinafter, an exemplary embodiment in which the third mask MASK3 is the slit mask will be described.

The second photoresist patterns 170a, 170b, and 170c include a first pattern part 170a corresponding to the light blocking part 810, a second pattern part 170b corresponding to the double half transmission part 820a and 820b, and a third pattern part 170c corresponding to the single half transmission part 830. The second photoresist film corresponding to the light transmission part 840 is removed by developing solution.

The first pattern part 170a is formed on the passivation layer 160 corresponding to the source electrode PSE, the channel part CH, the drain electrode PDE, and the second drain electrode DE2. The first pattern part 170a may have a thickness substantially the same as the initial thickness of the second photoresist film corresponding to the light blocking part 810. The second pattern part 170b extends from the first contact electrode PCNT to an end portion 131 of the first protrusion 130b along the first protrusion 130b and covers the end portion 131 of the first protrusion 130b. The second pattern 170b extends from the second contact electrode CNT1 to an end portion 133 of the second protrusion 130c along the second protrusion 130c and covers the end portion 133 of the second protrusion 130c. The third pattern part 170c is formed on the passivation layer 160 corresponding to the storage line STL. The third pattern 170c has a thickness that is thinner than a thickness of the first pattern part 170a. The thickness of the third pattern 170c is substantially the same as a thickness of the second pattern part 170b or substantially similar to the thickness of the second pattern part 170b. Accordingly, the second and third pattern parts 170b and 170c may be simultaneously removed through the following process.

The double half transmission part 820a and 820b includes a first region 820a, in which first slit patterns spaced apart from each other by a first width are disposed, and a second region 820b, in which second slit patterns spaced apart from each other by a second width are disposed. The first slit patterns of the first region 820a and the second slit patterns of the second region 820b may be connected to each other.

The first region 820*a* is disposed in an area corresponding to the first contact electrode PCNT and the second contact electrode CNT1. The second region 820*b* is disposed in an area corresponding to the end portion 131 of the first protrusion 130*b* and the end portion 133 of the second protrusion 130*c*. A boundary 820*c* between the first region 820*a* and the second region 820*b* is formed between an end portion 146 of the first contact electrode PCNT and the end portion 131 of the first protrusion 130*b*. The boundary 820*c* between the first region 820*a* and the second region 820*b* is also formed between the end portion 148 of the second contact electrode CNT1 and the end portion 133 of the second protrusion 130*c*.

The first region 820*a* has first slit patterns with a first width and the second region 820*b* has second slit patterns with a second width that is greater than the first width. Accordingly, a thickness of the remaining second photoresist film corresponding to the first region 820*a* is greater than a thickness of the remaining second photoresist film corresponding to the second region 820*b*.

Accordingly, the second pattern part 170*b* may be uniformly formed along the first contact electrode PCNT and the first protrusion 130*b* that may be gently inclined against the upper surface of the gate insulating layer 120. The second pattern part 170*b* extends from the first contact electrode PCNT to the first protrusion 130*b* along the end portion 146 of the first contact electrode PCNT and covers the end portion 146 of the first contact electrode PCNT. The second pattern part 170*b* also extends from the first protrusion 130*b* to cover the end portion 131 of the first protrusion 130*b* along the end portion 131 of the first protrusion 130*b*. The second pattern part 170*b* also extends along the end portions of the second contact electrode CNT1 and the second protrusion 130*c* that may be gently inclined against the upper surface of the gate insulating layer 120 to cover the end portion 148 of the second contact electrode CNT1 and the end portion 133 of the second protrusion 130*c*.

The third mask MASK3 includes the double half transmission part 820*a* and 820*b* in order to remove a step generated when the source metal layer 140 and the channel layer 132 and 134 are simultaneously patterned by the second mask MASK2 in a conventional three-mask process. The boundary 820*c* of the double half transmission part 820*a* and 820*b* may be aligned with an end portion (not shown) of the patterned source metal layer.

In a photo process using the third mask MASK3, when the display substrate is misaligned with the third mask MASK3, the margin of the photo process may be decreased. Particularly, when the boundary 820*c* of the double half transmission part 820*a* is misaligned with the end portion of the patterned source metal layer, many contact defects between the switching element and the pixel electrode or the first transistor and the second transistor may be generated.

According to the present invention, since the first protrusion 130*b* corresponding to the boundary of the double half transmission part 820*a* and 820*b* is formed, the third mask may be misaligned with the display substrate by the first protrusion length X of the first protrusion 130*b*. Also, since the second protrusion 130*c* is formed, the third mask MASK3 may also be misaligned with the display substrate by the second protrusion length Y of the second protrusion 130*c*. Accordingly, reliability of the photo process using the third mask MASK3 may be enhanced.

In the above-mentioned exemplary embodiment of the present invention, the second photoresist film is formed using the positive photoresist material. In another exemplary embodiment of the present invention, the second photoresist film may be formed using the negative photoresist material. When the second photoresist film is formed using the negative photoresist material, areas in which the light blocking part 810 and the light transmission part 840 are formed are switched with each other. Positions in which the first region 820*a* and the second region 820*b* of the double half transmission part are formed are also switched with each other.

Referring to FIG. 8C, the passivation layer 160 and the gate insulating layer 120 are etched through a process using the second photoresist patterns 170*a*, 170*b*, and 170*c* as a mask. For example, the process using the second photoresist patterns may be a dry etching process using an etching gas including $SF_6$ and $SF_4$. The etching gas may further include a small amount of oxygen gas so that the passivation layer 160 and the gate insulating layer 120 may be uniformly etched. The base substrate 110 is partially exposed through a region in which the passivation layer 160 and the gate insulating layer 120 are etched. For example, a portion of the base substrate 110 corresponding to the pixel may be exposed.

Figure 8D:
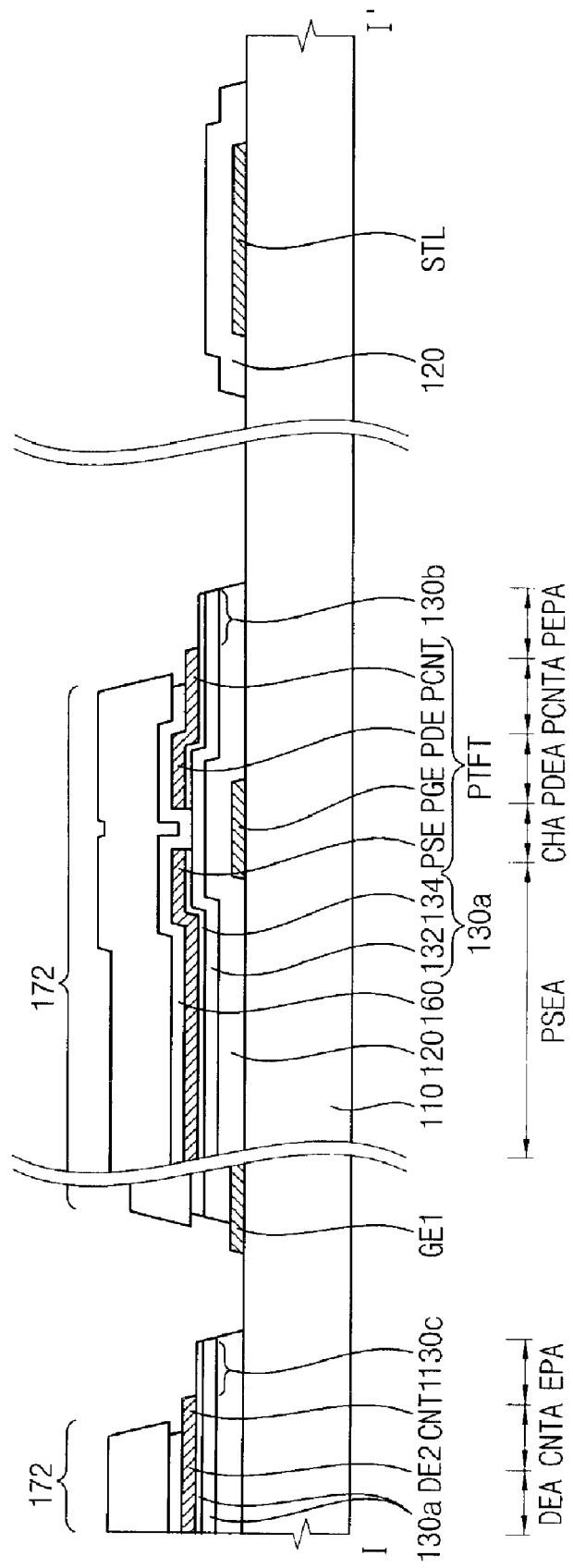

Referring to FIG. 8C and FIG. 8D, the second photoresist patterns 170*a*, 170*b*, and 170*c* are etched back to form a second remaining pattern 172. Then, the second remaining pattern 172*a* is etched through a process using a mask.

In detail, the second photoresist patterns 170*a*, 170*b*, and 170*c* are etched by a predetermined thickness to form the second remaining pattern 172. For example, the second remaining pattern 172 may be formed through an ashing process using oxygen plasma. For example, the second pattern part 170*b* and the third pattern part 170*c* are removed through the ashing process and the first pattern part 170*a* having a predetermined thickness remains to form the second remaining pattern 172. The passivation layer 160 on the first contact electrode PCNT, the first protrusion 130*b*, the second contact electrode CNT1, the second protrusion 130*c*, and the storage line STL are exposed through the second remaining pattern 172.

Then, the exposed passivation layer 160 is etched through a process using the second remaining pattern 172 as a mask to expose the first contact electrode PCNT, the first protrusion 130*b*, the second contact electrode CNT1, the second protrusion 130*c*, and a portion of the gate insulating layer 120 disposed on the storage line STL.

An undercut, which corresponds to a recess of an end portion of the passivation layer 160 with respect to an end portion of the second remaining pattern 172, may be generated since the process using the second remaining pattern as a mask is an isotropic dry etching process.

Referring to FIG. 4 and FIG. 8E, a transparent electrode layer 180 is formed on the base substrate 110 having the second remaining pattern 172 formed thereon. The transparent electrode layer 180 covers the second remaining pattern 172. The transparent electrode layer 180 is formed using transparent conductive metal. The transparent conductive metal includes indium tin oxide (ITO), indium tin oxide (IZO), etc.

The transparent electrode layer 180 may be formed on the base substrate 110 through a sputtering method. When the transparent electrode layer 180 is formed, a portion of the transparent electrode layer 180 formed on the second remaining pattern 172 and a portion of the transparent electrode 180 formed on the first contact electrode PCNT and the second contact electrode CNT1 may be electrically and physically divided by the undercut.

Then, the second remaining pattern 172 and a portion of the transparent electrode layer 180 formed on the second remaining pattern 172 may be simultaneously removed. A photoresist stripper solution penetrates between the second remaining pattern 172 and the passivation layer 160 through the undercut to remove the second remaining pattern 172. The second remaining pattern 172 may be removed to pattern the transparent electrode layer 180. Accordingly, a pixel electrode PE connected to the switching element and a first transparent electrode pattern TE1 connecting the first transistor to the second transistor may be formed.

The pixel electrode PE contacts the first contact electrode PCNT and extends from the first contact electrode PCNT to the first protrusion 130b along the end portion 146 of the first contact electrode PCNT. The pixel electrode PE extends as far as the portion of the base substrate 110 uncovered by the first protrusion 130b to cover the end portion 131 of the first protrusion 130b. The pixel electrode PE extends to contact a portion of the gate insulating layer 120 on the storage line STL.

The first transparent electrode pattern TE1 contacts the second contact electrode CNT1 and extends from the second contact electrode CNT1 to the second protrusion 130c along the end portion 148 of the second contact electrode CNT1. The first transparent electrode pattern TE1 extends as far as a portion of the base substrate 110 uncovered by the second protrusion 130c to cover the end portion 133 of the second protrusion 130c. The first transparent electrode pattern TE1 extends as far as an end portion of the first gate electrode GE1 to connect the first transistor to the second transistor.

In the above, the protrusions are applied, for example, to a switching element in the display area and the transistors in a peripheral area. However, the protrusions may be applied to a structure in which a contact electrode of a metal electrode formed from the source metal layer contacts an optical electrode pattern formed from a transparent electrode layer.

According to the display substrate and the method of manufacturing the display substrate in accordance with exemplary embodiments of the present invention, a channel layer may be formed to ensure an overlay margin of a mask employed in the next process. Accordingly, the margin of a photo process may be improved, and the reliability of the display substrate and a process for manufacturing the display substrate may be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a display substrate, comprising:
   forming a channel layer and a source metal layer on a base substrate;
   forming a first photoresist pattern comprising a first thickness part formed in a contact area of the source metal layer, and a second thickness part formed in an end area of the source metal layer, the end area being connected to the contact area, the second thickness part being thinner than the first thickness part;
   patterning the source metal layer and the channel layer using the first photoresist pattern to form a contact electrode on the contact area and a protrusion protruding beyond the contact electrode and extending from the contact area to the end area;
   forming a passivation layer on the base substrate; and
   forming a transparent electrode layer to contact a portion of the contact electrode exposed by removing a portion of the passivation layer corresponding to the contact electrode and the protrusion,
   wherein patterning the source metal layer and channel layer comprises etching the source metal layer and the channel layer using the first photoresist pattern, removing the second thickness part of the first photoresist pattern, and removing an end portion of the contact electrode exposed through the first photoresist film of which the second thickness part is removed, and
   wherein etching the source metal layer and the channel layer comprises forming a switching pattern formed in a source area, a channel area, and a drain area and connected to the contact electrode.

2. The method of claim 1, wherein the first photoresist pattern comprises a positive photoresist material.

3. The method of claim 2, wherein the first photoresist pattern is formed through a photo process using a mask comprising:
   a light blocking part corresponding to the contact area to block light irradiated onto the light blocking part; and
   a half transmission part corresponding to the end area to partially transmit light irradiated onto the half transmission part.

4. The method of claim 3, wherein the half transmission part comprises a plurality of slits.

5. The method of claim 3, wherein the half transmission part comprises a transparent substrate and a half transmission layer disposed on the transparent substrate to partially transmit light irradiated onto the half transmission part, and
   the light blocking part comprises the transparent substrate and a light blocking layer disposed on the transparent substrate to block light irradiated onto the light blocking part.

6. The method of claim 1, wherein removing an end portion of the contact electrode comprises removing the switching pattern to form a source electrode of a switching element disposed in the source area and a drain electrode of the switching element spaced apart from the source electrode, and the drain electrode is connected to the contact electrode and disposed in the drain area.

7. The method of claim 6, wherein forming a transparent electrode layer comprises:
   forming a second photoresist pattern comprising a first pattern part corresponding to the drain area of the passivation layer, and a second pattern part corresponding to the contact area and the end area; and
   patterning the transparent electrode layer using the second photoresist pattern to form a pixel electrode connected to the switching element.

8. The method of claim 7, wherein the second photoresist pattern comprises a positive photoresist material.

9. The method of claim 8, wherein the second photoresist pattern is formed using a mask comprising a light blocking part corresponding to the contact area to block light irradiated onto the light blocking part and a double half transmission part corresponding to the end area to partially transmits light irradiated onto the half transmission part.

10. The method of claim 9, wherein the double half transmission part comprises a first region having a first transmissivity and a second region having a second transmissivity that is smaller than the first transmissivity.

11. The method of claim 10, wherein a boundary region between the first region and the second region corresponds to the end area.

12. The method of claim 7, wherein patterning the transparent electrode layer comprises:
   removing the second pattern part of the second photoresist pattern to expose portions of the passivation layer disposed on the contact area and the end area;

removing the passivation layer using the second photoresist film remaining on the passivation layer; and removing a portion of the transparent electrode layer disposed on the second photoresist film remaining on the passivation layer.

13. The method of claim 12, wherein forming a switching pattern comprises forming a source line connected to the switching pattern.

14. The method of claim 13, further comprising:

forming a gate metal layer between the base substrate and the channel layer;

patterning the gate metal layer to form a gate line extending along a direction crossing the source line and a gate electrode of the switching element; and forming a gate insulating layer between the base substrate having the gate line and the gate electrode formed thereon and the channel layer.

15. The method of claim 14, wherein removing the second pattern part of the second photoresist pattern comprises removing the passivation layer in the pixel and the gate insulating layer in the pixel using the second photoresist pattern.

16. The method of claim 15, wherein the pixel electrode extends from the contact area to the pixel along the end area to cover the end area and contact a portion of the base substrate corresponding to the exposed pixel.

* * * * *